Jan. 16, 1951 I. J. P. JAMES 2,538,250

FREQUENCY DIVIDING APPARATUS

Filed Feb. 7, 1947

Inventor:
IVANHOE JOHN PENFOUND JAMES
H. G. Grover
ATTORNEY

Patented Jan. 16, 1951 2,538,250

UNITED STATES PATENT OFFICE 2,538,250

FREQUENCY DIVIDING APPARATUS

Ivanhoe John Penfound James, South Ealing, London, England, assignor to Electric & Musical Industries Limited, Hayes, Middlesex, England, a company of Great Britain Application February 7, 1947, Serial No. 727,250
In Great Britain January 15, 1946

Section 1, Public Law 690, August 8, 1946
Patent expires January 15, 1966

2 Claims. (Cl. 250—27)

This invention relates to pulse-operated thermionic valve apparatus, such as for example, frequency dividers, and electrical counters and the like in which frequency division occurs.

In the specification of U. S. Patent No. 2,113,011, there is described pulse-operated thermionic valve apparatus which comprises a switching device operated on the application of master pulses to said apparatus, a condenser which when the switching device is in one condition is charged from a source of potential through a first unidirectionally-conducting device and when the condition of said switching device is changed is discharged through a second unidirectionally-conducting device connected in parallel with the first but in opposite sense, a second condenser arranged to receive increments of charge through one of said unidirectionally-conducting devices so that on the application of successive master pulses to said apparatus there is generated across said second condenser a step waveform potential the increments of which are due to said increments of charge, and a triggered device so arranged that a transition thereof is initiated when said step waveform has reached a predetermined amplitude. When said transition has been initiated, said second condenser is discharged and another charging cycle thereof commences. Such apparatus is referred to hereinafter as apparatus of the kind described.

In one form of apparatus described in said specification said triggered device comprises a blocking oscillator. Such apparatus is particularly applicable to television systems for the purpose of obtaining, for example, frame-frequency pulses from pulses of a master frequency. In employing such apparatus in television systems it may be required to divide the master-frequency pulses by such a number as 405, in which case a circuit similar to that shown in Figure 3 of the aforesaid patent specification may be employed using three cascaded dividing stages, the first stage dividing by 5 and the other two stages dividing each by 9. The potential set up across said second condenser is of a step waveform and after a predetermined number of master pulses are applied to the switching device, i. e., valve $V_1$ in the aforesaid Figure 3, the valve $V'_1$ of the triggered device, i. e., the blocking oscillator shown in said Figure 3, will be triggered off the rising edge of the final step in the waveform applied to the control electrode of the valve $V'_1$. It is assumed that the master pulses applied to the valve $V_1$ are negative pulses and the valve $V_1$ is normally conducting and is rendered non-conducting on the application of said master pulses. The rising edge of the final step in the waveform corresponds with the valve $V_1$ being rendered non-conducting, and if the frequency of the master pulses is high stray capacities will tend to delay the triggering of the triggered device since the stray capacities will prevent the rising edges of the step waveform being sufficiently steep to effect an instantaneous triggering action. The triggering of the next triggered device will be determined by the characteristics of the transformer employed in the blocking oscillator, if such an oscillator is used, of the first stage. Each time the valve of the blocking oscillator of the first stage conducts the anode potential of the valve of the blocking oscillator is of pulse-like form and it is these pulses which, after a predetermined number have been generated, serve to trigger the next triggered device. Such triggered device is triggered by the rear edge of the anode potential waveform but, due to the characteristics of the transformer of the blocking oscillator and variations in the potentials of the valve due to insufficient smoothing of the D. C. supply, and possibly, pickup of mains hum and stray pulse components, said rear edge is liable to be intermediate so that inaccurate synchronisation may result. The effect is cumulative throughout the stages and since the duration of the pulses produced by the last stage will, in general, be long compared with the period of the master pulses, the output pulses obtained from the last stage are liable to fluctuate relatively to the master pulses, not only in synchronisation but in duration. If the output pulses are employed as frame-frequency synchronising pulses for synchronising a television receiver operating on an interlaced transmission, it follows that the interlacing will not be satisfactory.

One of the objects of the present invention is to provide an improved pulse-operated thermionic valve apparatus in which the timing and/or duration of the output pulses is more accurately related to the timing of the master pulses compared with the arrangement shown in Figure 3 of the aforesaid patent specification.

According to the present invention there is provided pulse-operated thermionic valve apparatus of the kind described wherein said triggered device is arranged to have applied to it said step-waveform potential and also said master pulses, the latter pulses serving to initiate transitions of said triggered device.

In one form of the present invention each of said master pulses is applied to said triggered device after each of said potential increments, whereby a transition of said triggered device is initiated by the effect of a master pulse when said potential is simultaneously effective and has reached a predetermined amplitude.

In an example of this form of the invention, said potential increments are initiated by trailing edges of said master pulses, and said transition is initiated by the leading edge of a master pulse. It will be appreciated that in this case the edge of the master pulse which initiates transition of the triggered device occurs after the final increment in the step-waveform potential, this being produced by the preceding edge in the master pulse waveform so that the timing of the triggering is not dependent upon the steepness of the rising edges of the step waveform.

Said triggered device can in consequence be used to produce a pulse waveform which is more nearly synchronous with the master pulses than obtainable with the arrangement shown in Figure 3 of the aforesaid patent specification, and where the apparatus comprises a further stage in which a further step waveform potential is generated, said triggered device may constitute the switching device for said further stage, the triggered device of said further stage being arranged to have applied to it said pulse waveform and also said further potential, each pulse of said pulse waveform being added after each increment of said further potential, whereby a transition of the triggered device of said further stage is initiated by the effect of a pulse of said pulse waveform when said further potential is simultaneously effective and has reached a predetermined amplitude. In this way said transition of said further triggered device is more nearly synchronous with said master pulses, in comparison with Figure 3 of the aforesaid patent specification. If the triggered device which constitutes the switching device of said further stage comprises, for example, a blocking oscillator, the pulse waveform produced by it will be effectively synchronous with the master pulses, since the switching on of the valve of the oscillator will be effected by master pulses, and hence said transitions of the further triggered device will not be dependent upon the characteristics of the transformer of the oscillator.

In another form of the present invention in which transitions of the triggered device are arranged to occur effectively in synchronism with the switching on of the preceding switching device so that said transition is much less affected by stray capacities than in the arrangement shown in Figure 3 of the aforesaid patent specification thermionic valve apparatus of the kind described is provided wherein said switching device comprises a thermionic valve which is switched alternately from a non-conducting to a conducting condition in the application of master pulses to said apparatus thereby to cause the first said condenser to be alternately charged and discharged and said second condenser is arranged to receive increments of charge through the second said unidirectionally conducting device, whereby said potential increments are effectively synchronous with the switching on of said switching device.

According to another form of the invention, pulse-operated thermionic valve apparatus of the kind described is provided wherein said triggered device is arranged to have applied to it said step waveform potential and also said master pulses in such a way that said potential and said master pulses initiate alternate transitions of said triggered device whereby said triggered device can be used to produce pulses whose width is controlled by said master pulses. This form of the invention is especially applicable to the case where the triggered device comprises a multivibrator having a time constant circuit arranged normally to prevent a transition of said multivibrator by said master pulses during a predetermined interval following a transition initiated by said potential whereby pulses produced by said multivibrator can have a duration longer than the master pulse period, means being provided if desired to adjust said time constant.

It is to be understood that the edges on the step waveform referred to herein as "rising edges" are the edges which are produced by increases in the potential across said second condenser irrespective of whether the charge increments which cause the potential increments are positive or negative.

In order that the said invention may be clearly understood and readily carried into effect, it will now be more fully described with reference to the drawings, in which.

Figure 1:
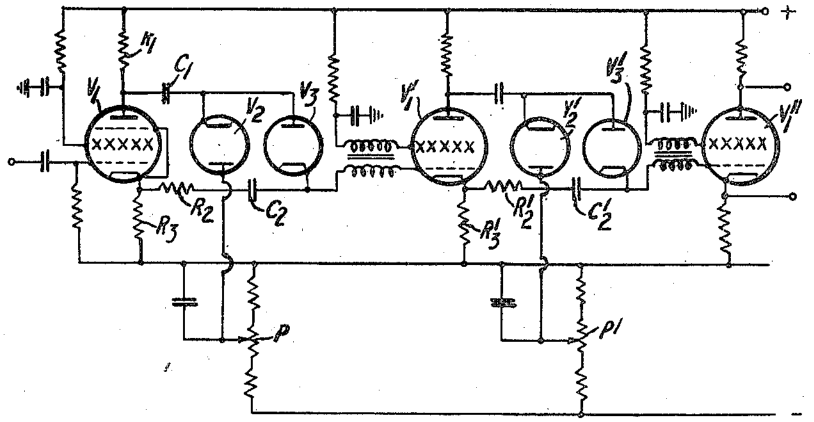
Figure 1 is a circuit diagram similar to that shown in Figure 3 of the aforesaid patent specification, but modified in accordance with one embodiment of the invention.
Figure 2:
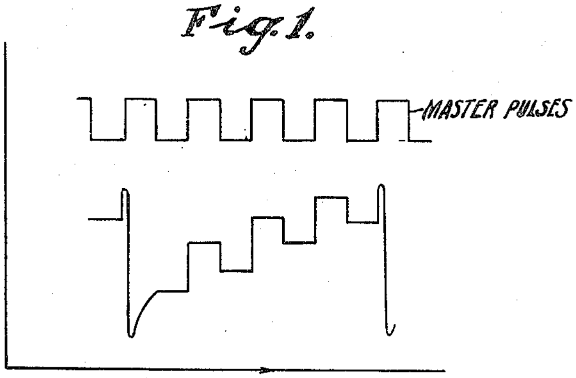
Figure 2 is a diagram representing the applied master pulses and the step waveform set up in the circuit shown in Figure 1.
Figure 3:
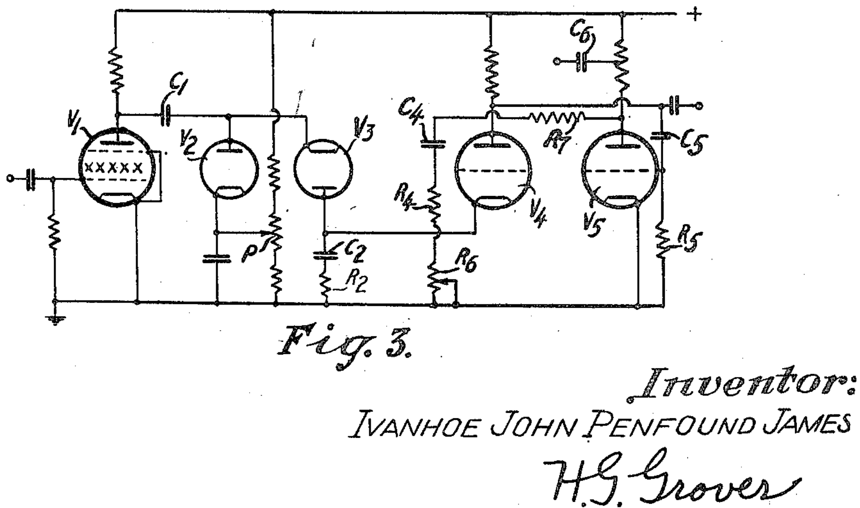
Figure 3 is a further form of the invention employing a multivibrator instead of a blocking oscillator as shown in Figure 1.

It will be seen that Figure 1 of the drawings is substantially similar to Figure 3 of the drawings of the aforesaid patent specification, and similar elements in both figures have been given the same reference characters. The circuit shown in Figure 1 of the drawings is, however, modified in that a resistance $R_3$ is inserted in the cathode circuit of the valve $V_1$ of the switching device and the cathode end of the resistance $R_3$ is connected via a resistance $R_2$ to the condenser $C_2$, as shown. The anode of the diode $V_2$ is maintained at a suitable negative potential from a potentiometer P. The valve $V_1$ is normally non-conducting and the master pulses applied to the control electrode of the valve serve to render the valve conducting and while the valve $V_1$ is non-conducting the diode $V_3$ is rendered conducting so that an increment of charge is added to the condenser $C_2$ which produces a corresponding increase in the potential across said condenser. When a master pulse, applied to the control electrode of the valve $V_1$ renders the valve conducting, the diode $V_3$ is rendered thereby non-conducting so that the condenser $C_2$ retains its charge and while the diode $V_3$ remains non-conducting the potential across it effectively remains steady. The provision of the resistance $R_3$ in the cathode circuit of the valve $V_1$ serves, however, to apply to the condenser $C_2$ the master pulses which are applied to the control electrode of the valve $V_1$ so that an impulsive rise in the potential of the condenser is produced while the potential across it remains effectively steady. The occurrence of a trailing edge of a master pulse terminates the conducting period of the valve $V_1$ whereupon the condenser $C_2$ commences to receive its next increment of charge. Thus, on the application of successive master pulses to the control electrode of the valve $V_1$ a step waveform potential is set up across the condenser $C_2$ the increments of which are initiated by the occurrence of the trailing edges of the master pulses and there is applied to the control electrode of the valve $V'_1$ of the blocking oscillator not only this potential but also the master pulses, the said pulses being applied after each of said increments. The potential on the control electrode of the blocking oscillator valve $V'_1$ during one cycle in the operation of said oscillator has therefore the waveform such as indicated in Figure 2 from which it will be observed that the added master pulses have approximately twice the amplitude of the increments of said step waveform potential. The blocking oscillator is triggered by the leading edge of a master pulse when the step waveform potential is simultaneously effective and has reached a predetermined amplitude. Thus, triggering of the valve $V'_1$ occurs in proper time relationship with the master pulses and is substantially unaffected by stray capacities associated with the circuit.

The circuit shown in Figure 1 is a two-stage counter or divider and the output pulses from the anode of the valve $V'_1$ are fed to the unidirectionally-conducting devices $V'_2$ and $V'_3$ so that a further step waveform potential is set up across condenser $C'_2$. There is included in the cathode circuit of valve $V'_1$ a resistance $R'_3$ the cathode end of which is connected via a resistance $R'_2$ to the condenser $C'_2$. In this manner the pulse waveform produced by the valve $V'_1$ is superimposed on said further step waveform potential set up across the condenser $C'_2$ in the same way as the master pulses are superimposed on the step waveform potential set up across condenser $C_1$ so that the triggering of the valve $V''_1$ is also initiated by the leading edge of a pulse of the pulse waveform produced by the valve $V'_1$. Similarly, if any further stage of division is employed the pulses set up by the valve $V''_1$ can also be fed by way of the unidirectionally conducting devices to the valve of the blocking oscillator of the further stage.

If desired, instead of feeding the waveform set up by the valve $V'_1$ to the condenser $C'_2$ the master pulses applied to the control electrode of the valve $V_1$ may be fed to the condenser $C'_2$. In addition the master pulses may be applied directly to the control electrode of either of the valves $V'_1$ and $V''_1$ instead of by way of the condenser $C_2$ or $C'_2$ as the case may be, and pulses may also be applied to an electrode other than that to which the step waveform potential is applied.

The final pulse output will be synchronous with the master pulses although it will be slightly delayed with respect to the master pulses owing to the finite time taken for its generation.

The potential increments are determined approximately by $$\frac{E.C_1}{C_1+C_2}$$

where E is the H. T. potential. The resistance $R_3$ is then chosen so that the potential across it is approximately twice the amplitude of the step potentials. The resistance $R_2$ is then chosen to satisfy the equation $$R_2=\frac{C_1R_1}{C_2}-R_3$$

If the stray capacity ($C_s$) associated with the anode of valve $V_1$ is appreciable then a more accurate value for $R_2$ is given by $$R_2=\frac{(C_1+C_s)R_1}{C_2}-R_3$$

The provision of the resistance $R_2$ is not however essential although its use may be preferred since it serves to maintain the step waveform rectangular in form by eliminating a "whisker" which would otherwise be present at the commencement of each rising edge.

Although the circuit shown in Figure 1 employs a blocking oscillator type of triggered device it will be appreciated that the invention can be applied to other types of triggered devices, such as gas discharge tubes, multivibrators and transitron oscillators.

Figure 3 of the drawings illustrates a form of the invention employing a multivibrator type of triggered device comprising a pair of valves $V_4$ and $V_5$, the control electrode of the valve $V_4$ being connected via a condenser $C_4$ to the anode of the valve $V_5$, whilst the control electrode of the valve $V_5$ is connected via a condenser $C_5$ to the anode of the valve $V_4$, grid lead resistances $R_4$, $R_5$ and $R_6$ being provided as shown. In the form of the invention shown in Figure 3, the valve $V_1$ of the switching device is arranged to be normally non-conducting and the master pulses are arranged to render said valve periodically conducting. The unidirectionally conducting devices $V_2$ and $V_3$ as shown in Figure 3 are connected in reverse sense to the corresponding devices of Figure 1 so that the step waveform potential set up across the condenser $C_2$ and applied to the cathode of the valve $V_4$ of the multivibrator is in the form of negative steps, that is to say the charge increments to which increases in potential across the condenser are due are, in this case, increments of negative charge so that the potential across the condenser becomes increasingly negative with respect to earth potential. The time constant of the condenser $C_5$ and resistance $R_5$ is arranged to be long (in fact the control electrode of valve $V_5$ may be D. C.-coupled to the anode of valve $V_4$), whilst the time constant of the resistances $R_4$, $R_6$ and condenser $C_4$ is arranged to be short as it determines the width of the pulse set up by the multivibrator. To adjust the width of the pulse the grid leak resistance $R_6$ is made variable, as shown. With the circuit shown in Figure 3 the increments in the potential set up across condenser $C_2$ are produced by the leading edge of the positive master pulses with the result that the valve $V_4$ of the multivibrator is switched to a conducting condition, thereby to trigger the multivibrator, by the leading edge of a master pulse, that is to say, when the anode potential of the valve $V_1$ is suddenly reduced by the valve $V_1$ being switched on, the triggering being therefore substantially unaffected by stray capacities. The master pulses applied to the valve $V_1$ are also applied via a condenser $C_6$ to the anode of the valve $V_5$ so that after the multivibrator has been triggered by the step waveform potential the next transition of the multivibrator, that is to its original state with the valve $V_4$ non-conducting is effected by the master pulses. By a suitable choice of values for the condenser $C_4$ and the resistances $R_4$ and $R_6$, the said next transition of the multivibrator may be prevented during a predetermined interval following the transition initiated by the step waveform potential so that the conducting period of the valve $V_4$ can be made longer than the master pulse period. Thus, not only are the leading edges of the generated pulses effectively synchronised by the master pulses, but the trailing edges of the generated pulses are likewise synchronised by the master pulses so that the width of said pulses can be accurately determined.

Instead of feeding the master pulses to the anode of the valve $V_5$ the master pulses can be applied to the control electrode of the valve $V_4$, but in either case the amplitude of the master pulses at the control electrode will be arranged to be less than the increments in the step waveform potential applied to the cathode of valve $V_4$, so that switching on of the valve $V_4$ is not determined by the master pulses applied at its control electrode. By the suitable use of a time delay network it is possible by advancing or delaying the master pulses applied to the anode of valve $V_5$, or to the control electrode of valve $V_4$, relative to the master pulses on the grid of valve $V_1$ to adjust the width of the generated pulses within wider limits.

In Figure 3 the resistance $R_2$ which is employed in series with the condenser $C_2$ is not absolutely necessary although it is preferred, since it assists in the triggering of the multivibrator by introducing a short, peaky pulse at the commencement of each increment of the step waveform potential. If desired, a resistance $R_7$ may be inserted between the condenser $C_4$ and the anode of valve $V_5$ in order to reduce the effect of grid current damping so as to sharpen the pulse produced at the anode of valve $V_5$ when valve $V_4$ conducts.

If three cascaded dividing stages are required in order to divide the master frequency pulses by 405, for example, a two-stage divider as shown in Figure 1 may have a third stage applied to it, similar to the arrangement shown in Figure 3, the valve $V_1$ in Figure 3 in that case, constituting the triggered device of the second stage of Figure 1, that is replacing the valve $V''_1$.

As previously indicated the present invention is particularly applicable to television systems, for example for obtaining at the transmitter frame frequency pulses from pulses of a master frequency. However it will be understood that the invention is also applicable to television and like receivers designed to receive for example transmissions in which only line synchronising pulses are transmitted, division being carried out in the receiver to obtain frame synchronising pulses.

I claim:

1. A frequency divider comprising a thermionic tube having anode, cathode, and control electrodes, means for maintaining said tube in a normally cut-off state, a first electrical energy storage means connected in the anode-cathode path of said thermionic tube, a diode connected to said first electrical energy storage means to discharge the same and maintained in a normally cut-off state, a second electrical energy storage means, a second diode connected serially with the first and second electrical energy storage means to charge the same and maintained in a normally conducting state, a source of master pulses of a predetermined frequency, means for impressing said pulses onto the control electrode-cathode path of said tube to render the tube conducting intermittently under the control of said master pulses and to effect the discharge of energy stored in said first electrical energy storage means at intermittent intervals, impedance means connected in series with the cathode of said tube and having the master pulses impressed thereon, an output circuit connected to said impedance means and to said second electrical energy storage means whereby the output circuit contains representations of the energy stored in said second electrical energy storage means and at least a portion of the energy of at least a portion of the master pulses whereby the representations in the output circuit comprise signals having a frequency of that of the master pulses and having a potential which varies by incremental steps.

2. Apparatus in accordance with claim 1 wherein there is provided in addition an oscillator connected in the output circuit and keyed by the potentials in the output circuit when said potential reaches a predetermined value whereby said oscillator produces energy of a frequency which is a fractional value of that of the master pulses.

IVANHOE JOHN PENFOUND JAMES.

REFERENCES CITED

The following references are of record in the file of this patent:

UNITED STATES PATENTS

| Number | Name | Date |
|---|---|---|
| 2,113,011 | White | Apr. 5, 1938 |
| 2,415,567 | Schoenfeld | Feb. 11, 1947 |
| 2,450,360 | Schoenfeld | Sept. 28, 1948 |